(12) United States Patent
Medvedovsky et al.

(10) Patent No.: US 11,503,052 B2
(45) Date of Patent: Nov. 15, 2022

(54) BASELINING TECHNIQUES FOR DETECTING ANOMALOUS HTTPS TRAFFIC BEHAVIOR

(71) Applicant: RADWARE, LTD., Tel Aviv (IL)

(72) Inventors: Lev Medvedovsky, Netanya (IL); David Aviv, Tel Aviv (IL); Ehud Doron, Moddi'in (IL)

(73) Assignee: Radware, Ltd., Tel Aviv (IL)

( * ) Notice: Subject to any disclaimer, the term of this patent is extended or adjusted under 35 U.S.C. 154(b) by 318 days.

(21) Appl. No.: 16/721,186

(22) Filed: Dec. 19, 2019

(65) Prior Publication Data

US 2021/0194903 A1    Jun. 24, 2021

(51) Int. Cl.
*H04L 9/40* (2022.01)

(52) U.S. Cl.
CPC ...... *H04L 63/1425* (2013.01); *H04L 63/1416* (2013.01); *H04L 63/1433* (2013.01); *H04L 63/1466* (2013.01)

(58) Field of Classification Search
CPC ............. H04L 63/1416; H04L 63/1425; H04L 63/1433; H04L 63/1458; H04L 63/1466; H04L 63/168; H04L 63/14; H04L 63/1408; H04L 47/10
See application file for complete search history.

(56) References Cited

U.S. PATENT DOCUMENTS

| | | | |
|---|---|---|---|
| 7,617,170 B2 | 11/2009 | Chesla | |
| 8,438,639 B2 | 5/2013 | Lee et al. | |
| 9,154,516 B1 * | 10/2015 | Vaystikh | H04L 63/1425 |
| 9,294,502 B1 | 3/2016 | Benishti | |
| 10,270,794 B1 | 4/2019 | Mukerji et al. | |
| 10,511,624 B2 | 12/2019 | Holloway et al. | |
| 10,516,695 B1 | 12/2019 | Evans | |
| 10,728,280 B2 | 7/2020 | Reddy et al. | |
| 10,764,313 B1 | 9/2020 | Mushtaq | |
| 10,931,692 B1 * | 2/2021 | Mota | H04L 63/1458 |
| 2006/0107318 A1 | 5/2006 | Jeffries et al. | |

(Continued)

OTHER PUBLICATIONS

L. Litwin, "FIR and IIR digital filters," in IEEE Potentials, vol. 19, No. 4, pp. 28-31, Oct.-Nov. 2000, doi: 10.1109/45.877863. (Year: 2000).*

*Primary Examiner* — Daniel B Potratz
*Assistant Examiner* — Matthias Habtegeorgis
(74) *Attorney, Agent, or Firm* — M&B IP Analysts, LLC

(57) ABSTRACT

A system and method for detecting anomalous hypertext transfer protocol secure (HTTPS) traffic are provided. The method includes receiving samples of at least rate-based features, wherein the rate-based features demonstrate a normal behavior of at least HTTPS traffic directed to a protected entity; computing a short-term baseline and a long-term baseline based on the received samples, wherein the short-term baseline is adapted to relatively rapid changes in the HTTPS traffic and the long-term baseline is adapted to relatively slow changes in the HTTPS traffic; computing at least one short-term threshold respective of the short-term baseline and at least one long-term threshold respective of the long-term baseline; evaluating each of the at least one threshold against real-time samples of HTTPS traffic to determine whether behavior of the HTTPS traffic is anomalous; and generating alarm when anomaly is detected.

19 Claims, 5 Drawing Sheets

(56) References Cited

U.S. PATENT DOCUMENTS

| | | | |
|---|---|---|---|
| 2008/0086434 A1* | 4/2008 | Chesla | H04L 63/1458 |
| | | | 706/12 |
| 2011/0099622 A1 | 4/2011 | Lee et al. | |
| 2012/0174196 A1* | 7/2012 | Bhogavilli | H04L 63/1416 |
| | | | 726/5 |
| 2015/0207806 A1 | 7/2015 | Be'ery et al. | |
| 2015/0237527 A1 | 8/2015 | Knutson | |
| 2016/0164912 A1* | 6/2016 | Del Fante | H04L 67/02 |
| | | | 726/23 |
| 2017/0223049 A1 | 8/2017 | Kuperman et al. | |
| 2018/0007084 A1 | 1/2018 | Reddy et al. | |
| 2018/0034854 A1 | 2/2018 | Gong et al. | |
| 2018/0046811 A1 | 2/2018 | Andriani | |
| 2019/0020663 A1* | 1/2019 | Bartos | H04L 67/42 |
| 2019/0068624 A1 | 2/2019 | Compton | |
| 2019/0098043 A1 | 3/2019 | Banerjee et al. | |
| 2019/0104151 A1 | 4/2019 | Cheng et al. | |
| 2019/0158533 A1* | 5/2019 | Holloway | G06F 21/577 |
| 2019/0245866 A1* | 8/2019 | Anderson | H04L 63/166 |
| 2019/0288984 A1 | 9/2019 | Hajduczenia | |
| 2020/0076832 A1 | 3/2020 | Jusko et al. | |
| 2020/0120107 A1 | 4/2020 | McGrew et al. | |
| 2020/0137112 A1 | 4/2020 | Compton | |
| 2020/0204580 A1 | 6/2020 | Konda et al. | |

\* cited by examiner

BASELINING TECHNIQUES FOR DETECTING ANOMALOUS HTTPS TRAFFIC BEHAVIOR

TECHNICAL FIELD

This present disclosure generally relates to techniques for protecting network and computing resources from HTTPS flood attacks, and, specifically, for baselining techniques for detecting anomalous HTTPS traffic behavior causing such attacks.

BACKGROUND

These days, on-line businesses and organizations are vulnerable to malicious attacks. Recently, cyber-attacks have been committed using a wide arsenal of attack techniques and tools targeting both the information maintained by the on-line businesses and their IT infrastructure. Hackers and attackers are constantly trying to improve their attack strategies to cause irrecoverable damage, overcome current deployed protection mechanisms, and so on.

For example, recently-identified attacks have been committed through cryptographic protocols including, but not limited to: transport layer security (TLS), secure socket layer (SSL), Hyper Text Transfer Protocol Secure (HTTPS), and the like. An example, for such attacks is the encrypted denial-of-service (DoS) or encrypted distributed DoS (DDoS) attacks.

Typically, a DoS/DDoS attack is an attempt to make a computer or network resource unavailable or idle. A common technique for executing DoS/DDoS attacks includes saturating a target victim resource (e.g., a computer, a WEB server, an API server, a WEB application, and the like), with external requests. As a result, the target victim becomes overloaded, it cannot respond properly to legitimate traffic. When the attacker sends many applicative, or other, requests to a single network adapter, each victim resource would experience effects from the DoS attack. A DDoS attack is performed by controlling many machines and directing them to attack as a group. Various techniques for mitigating non-encrypted DoS/DDoS attacks are discussed in the related art. However, there are no efficient solutions for detecting application-layer encrypted DoS/DDoS attacks.

An encrypted DoS/DDoS attack is performed against victim resources having an encrypted connection with their clients or communicating over an encrypted communication protocol. An example of an encrypted DoS/DDoS attack is an HTTPS flood attack, as it is based on HTTP communications over a TLS/SSL encryption protocol.

In HTTPS flood attacks, attackers manipulate HTTP GET and POST requests in order to attack, or to overload, a victim resource. These attacks often use interconnected computers that have been taken over with the aid of malware, such as trojan horses, as part of an organized BOTNET. HTTPS flood attacks require less bandwidth to attack the targeted sites or servers because they target victim resources, rather than the networking infrastructure itself. For this reason, HTTPS floods are more difficult to detect using simple means. HTTPS flood attacks are one of the most advanced threats facing web servers today as it is difficult to distinguish between legitimate and malicious HTTPS traffic.

HTTPS flood attacks cannot be detected and mitigated by mere use of conventional techniques for mitigating non-encrypted DoS/DDoS attacks. This is due to the fact that current detection techniques typically are not adapted to decrypt the encrypted traffic, as this typically requires private encryption keys and computing power able to decrypt information encapsulated in the headers of transported HTTP packets. In addition, the need to constantly decrypt high volumes of traffic might, by itself, lead to denial of service conditions.

Further, since HTTPS flood attacks employ legitimate-appearing requests with or without high volumes of traffic, it is difficult to differentiate such requests from valid traffic. Thus, such types of DDoS attacks are among the most advanced non-vulnerability security challenges facing servers and applications today.

During the recent years, the majority of internet services have been based on encrypted WEB traffic, e.g., HTTPS. The incapacity to detect and mitigate HTTPS flood attacks significantly impacts online businesses that use cryptographic protocols. Such attacks exploit computing resources because encrypted traffic requires more resources for processing. For example, decryption of encrypted traffic by a targeted server consumes more CPU resources than the processing of non-encrypted traffic. Thus, even a "small scale" encrypted attack can cause a targeted server to become unresponsive.

It would be, therefore, advantageous to provide an efficient security solution for detecting and mitigating HTTPS flood attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method detecting anomalous hypertext transfer protocol secure (HTTPS) traffic. The method comprising receiving samples of at least rate-based features, wherein the rate-based features demonstrate a normal behavior of at least HTTPS traffic directed to a protected entity; computing a short-term baseline and a long-term baseline based on the received samples, wherein the short-term baseline is adapted to relatively rapid changes in the HTTPS traffic and the long-term baseline is adapted to relatively slow changes in the HTTPS traffic; computing at least one short-term threshold respective of the short-term baseline and at least one long-term threshold respective of the long-term baseline; evaluating each of the at least one threshold against real-time samples of HTTPS traffic to determine whether behavior of the HTTPS traffic is anomalous; and generating alarm when anomaly is detected.

Some embodiments disclosed herein include a system for detecting anomalous hypertext transfer protocol secure (HTTPS) traffic. The system comprises a processing circuitry; and a memory, the memory containing instructions that, when executed by the processing circuitry, configure the system to: receive samples of at least rate-based features, wherein the rate-based features demonstrate a normal behavior of at least HTTPS traffic directed to a protected entity;

compute a short-term baseline and a long-term baseline based on the received samples, wherein the short-term baseline is adapted to relatively rapid changes in the HTTPS traffic and the long-term short-term baseline is adapted to relatively slow changes in the HTTPS traffic; compute at least one short-term threshold respective of the short-term baseline and at least one long-term threshold respective of the long-term baseline; evaluate each of the at least one threshold against real-time samples of HTTPS traffic to determine whether the behavior of the HTTPS traffic is anomalous; and generate alarm when anomaly is detected.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
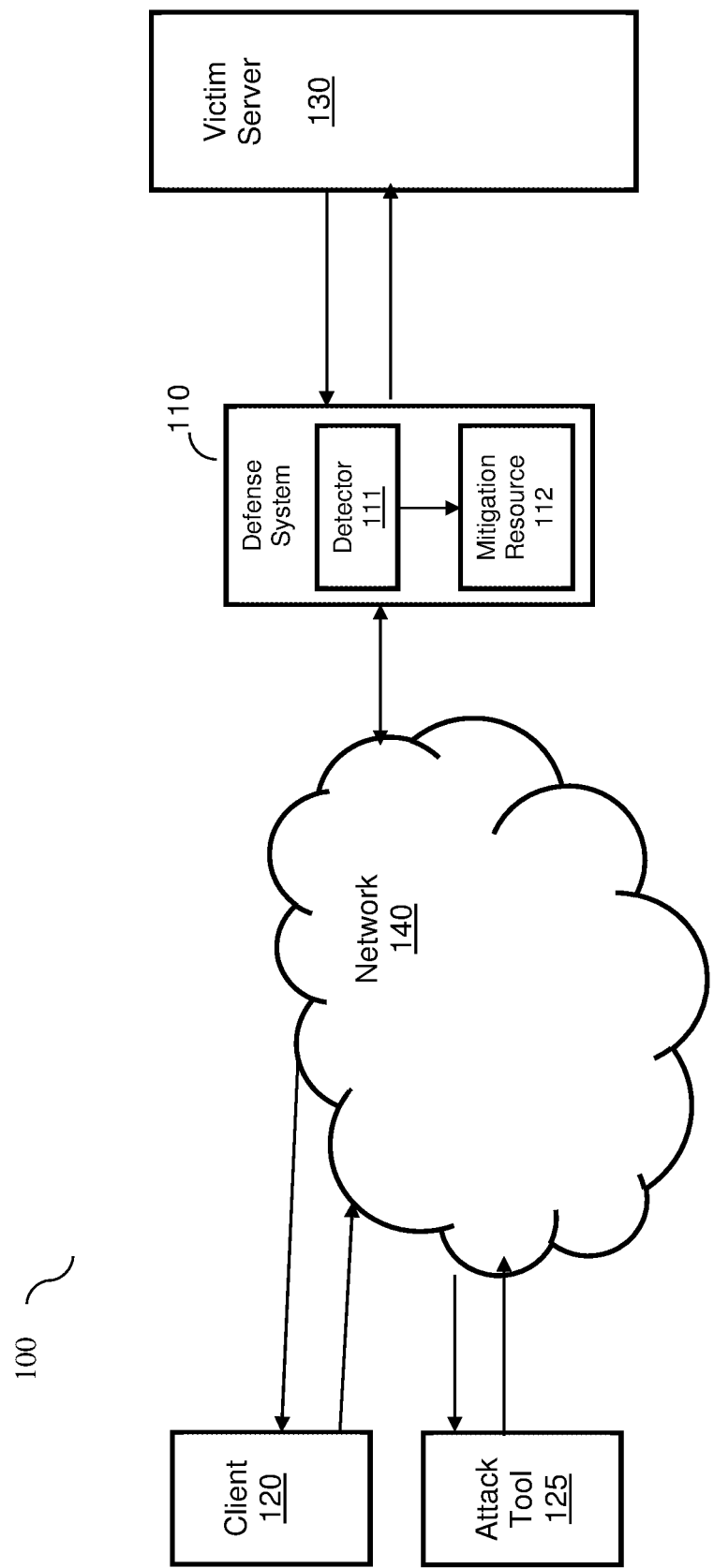
FIG. 1 illustrates an inline deployment of a defense system for detecting HTTPS flood attacks according to one embodiment.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic diagram 100 illustrating a defense system 110, utilized to describe the various embodiments. In the schematic diagram 100, client devices 120 and 125 communicate with a server 130 over a network 140. In order to demonstrate the disclosed embodiments, the client device 120 is a legitimate client (operated by a real user), the client device 125 is an attack tool (operated, for example, by a bot), and the server 130 is a "victim server", i.e., a server 130 under attack.

The attack tool 125 carries out the malicious attacks against the victim server 130, and, particularly, carries out HTTPS flood attacks. The attack tool 125 can be a dedicated tool for performing the encrypted attack, operating from an infected device. It should be noted that the embodiments disclosed herein are applied when multiple attack tools execute the attacks against the victim server 130 concurrently. Thus, the embodiments disclosed herein can also be used to detect and mitigate a large-scale attack campaign where a vast number of attack tools participate in attacking the protected entity, i.e., the victim server 130. Similarly, vast numbers of legitimate client devices 120 can operate concurrently to be delivered with the services proposed by the server 130. Both client devices 120 and 125 can reach the victim server 130 concurrently.

The network 140 may be, but is not limited to, a local area network (LAN), a wide area network (WAN), the internet, a cellular network, a metropolitan area network (MAN), a wireless network, an IoT network, or any combination thereof.

According to the disclosed embodiments, the defense system 110 is deployed in-line between the client 120 and the attack tool 125 and the victim server 130. The defense system 110 and the victim server 130 may be deployed in a cloud computing platform and/or in an on-premise deployment, such that they collocate together. The cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, when installed in the cloud, the defense system 110 may operate as a SaaS. In some configurations, the defense system 110 can also be deployed in a protection cloud platform as always-on protection.

The defense system 110 includes a detector 111 and a mitigation resource 112. The detector 111 in the defense system 110 is configured to inspect traffic flows between the client device 120, the attack tool 125, and the victim server 130 to detect encrypted DDoS attacks, and, in particular, HTTPS flood attacks. In other configurations, only ingress traffic from the client device 120 and the attack tool 125 to the server 130 is inspected.

The mitigation resource 112 is configured to perform one or more mitigation actions, triggered by the detector 111, in order to mitigate a detected attack. Examples for a mitigation resource 112 may be, but are not limited to, a scrubbing center or a multi-tiered mitigation system. The arrangement, configuration, and orchestration of a multi-tiered mitigation system is disclosed in U.S. Pat. No. 9,769,201, assigned to the common assignee, which is hereby incorporated by reference.

The victim server 130 is the entity to be protected from malicious threats. The server 130 may be a physical or virtual entity (e.g., a virtual machine, a software container, a serverless function, and the like). The communication with the victim server 130 is over an application-layer cryptographic protocol, such as HTTPS, based on any version of an encryption protocol such as SSL, TLS, and the like.

The victim server 130 may be a WEB server (e.g., a server under attack, a WEB application under attack, an API server, and so on). The attack tool 125 may be, for example, ddosim, LOIC, HULK, PyLoris, GoldenEye and the like. Such tools allow attackers to control HTTP Verbs to be used (GET, POST etc.), rates of HTTP requests, intervals between HTTP requests, delays between SYN packets, source IPs, ranges and distributions, use of WEB proxies for attack distribution, the number of concurrent TCP connections, the number of sockets, URLs, random URLs to mimic legitimate user behavior, and/or URLs to malform crafted HTTPS requests.

According to the disclosed embodiments, the defense system 110 is configured to inspect egress and ingress traffic from both the client device 120, the attack tool 125, and the victim server 130. The inspected traffic is analyzed to determine abnormal activity based on rate-based and rate-invariant features of the inspected traffic. The rate based traffic features and the rate-invariant traffic features demonstrate behavior of HTTPS traffic directed to the victim server 130.

Specifically, in an embodiment, several traffic features are defined and utilized: ingress traffic from the client device 120 to the victim server 130 is analyzed to determine a number of HTTPS requests per second: RPS, (as a rate-based feature) and the distribution (average) of HTTPS request size (as a rate-invariant feature). Further, egress traffic, from the victim server 130 to the client device 120 and the attack tool 125, is analyzed to determine the volume of HTTPS response sizes, as the responses' number of bytes per second (rate-based features) and the distribution (average) of HTTPS response sizes (rate-invariant feature).

According to some embodiments, additional traffic features include: an ingress traffic (from a client 120 and attacker 125 to the victim server 130) of HTTPS requests volumes in byte per second (a rate-based feature); ingress/egress ratio measured by the ratio between ingress HTTPS requests per second and egress HTTPS response volumes in byte per second (a rate-invariant feature); and egress/ingress measured as the ratio between egress HTTPS response volume in bytes per second and ingress measured by the number of requests per second (a rate-invariant feature). A traffic feature may be a combination of all the above-noted features.

The traffic feature may include computing a histogram reflecting the long-term distribution of the sizes of HTTPS requests and responses. It is assumed that, at peace-time, a typical distribution reflects a stable behavior of legit clients. Each histogram is computed from several bins such that each bin reflects the normalized probability of a request, or response size, to appear in each sample. According to some embodiments, the traffic feature may include a relative variance type of feature (such as a rate-invariant feature). The relative variance may be determined for ingress requests per second, relative variance for ingress byte per second, and egress responses or bytes per second.

The relative variance (RV) and relative variance baseline (RVBL) are rate-invariant criteria for distinguishing between attack and flash crowds: $RV=\langle x^2 \rangle / \langle x \rangle^2 - 1$, where $\langle \cdot \rangle$ designates averaging, and x is a set of samples in a small sliding window. The RVBL is the reference time series for assessing changes in RV.

The use of using relative variance is intuitive as, during peace-time and flash crowd scenarios, the web traffic is meant to be very "noisy" in its nature due, for example, to browsing a WEB page, reading the WEB page content, and clicking on another link, and so on, by a large number of independent clients. The attack traffic may be less noisy as the attack tool continuously sends HTTPS traffic without any delays and interferences. The relative variance is a kind of measurement to the "variability" of the traffic. In an embodiment, a real time value of the relative variance is measured during a small sliding window. The measured variance is compared against its medium-term baseline. It is expected that during the attack, the relative variance will decrease to, for example, 50% of the baseline, or lower.

As will be discussed below, an attack indication may be generated based on one of, or a combination of, the above-mentioned traffic features. In yet another embodiment, only the traffic from the devices 120, 125 to the victim server 130 is analyzed to determine a number of HTTPS requests per second, a volume of HTTPS requests in bytes per second (as a rate-based feature), and the distribution (average) of HTTPS request sizes (as a rate-invariant feature), and to determine a volume of HTTPS responses in bytes per second (a rate-based feature) and the distribution (average) of HTTPS response sizes (rate-invariant feature). This is useful for cases where only ingress traffic flows through the defense system 110. It should be noted that ingress traffic flows through the detector 111 and the mitigation resource 112.

In order to allow simple and efficient detector and mitigator deployment, all measurements are analyzed without undertaking any decryption activity and/or extracting headers of HTTPS requests or responses. Further, the disclosed embodiments allow for eliminating the need for decryption for the task of attack detection, simplifying the implementation of the of the defense system 110, and minimizing the usage of private keys by the defense system 110.

As will be discussed below, HTTPS flood attacks may be detected based on anomalies of each feature or based on a combination of these features. In an embodiment, an anomaly is detected based on baselines generated for the measurement of normal users' behavior, as defined according to the above features. Any deviation that persists for some time from the normal baseline is detected as an abnormal event. The normal behavior may be represented by normal access patterns of the legitimate user using the client device 120 to access the victim server 130.

The normal behavior, for each feature, can be varied among multiple servers (not shown) and may also have hourly and or weekly behavior patterns. For example, high traffic loads can be observed during late morning time, compared to very low traffic volumes during late nighttime, or regular working days compared to weekends. As such, the baseline computation is adapted to hourly changes in traffic, while eliminating attack patterns which are considered to introduce HTTPS floods as fast increases in the load of traffic, for the ingress or egress traffic. It should be emphasized that a deviation from the normal baselines is defined uniquely for the rate-based and rate-invariant features. Such deviation is detected as an abnormal event.

In an embodiment, the attack tool generating HTTPS requests, and the corresponding responses, will increase the probability of the appearance of specific requests or the sizes of the responses, and, therefore, significantly change the corresponding size distribution.

In an embodiment, an attacker executing a HTTPS flood attack can reasonably take one, or more, of the following strategies: generate a large number of requests, generate requests for large responses (e.g., request for a video clip), generate requests to abnormal (e.g. smaller or larger, in terms of the size of the HTTPS requests or/and the response these URLs induced, using HTTP cookies or not) numbers of URLs, other groups of URLs, and the like.

In another embodiment, the attacker can follow other strategies by sending large numbers of encrypted HTTPS POST requests with relatively large sizes for each of these legitimate like requests.

Detection of an HTTPS POST attack may be based on the detection of anomalies at one or more of the following traffic features: a number of HTTPS requests and an ingress BW (measured as an HTTPS request size volume in bytes per second), the POST requests imposed, a distribution of HTTPS request sizes, relative variances of ingress byte per second (BPS), and/or a ratio of an ingress BPS to an ingress number of HTTPS requests per second (RPS).

It should be noted that an attacker executing a HTTPS flood, and the flood's behavior, cannot reasonably follow similar statistics patterns to legitimate client devices. The behaviors of legitimate clients and attackers influence, in a different way, the rates and sizes (distribution) of HTTPS requests and responses and, further, influence the momentary structure of the request size and response size distributions, and the variability of corresponding HTTPS request and responses rates and loads.

Therefore, in order to detect HTTPS flood attacks, the defense system 110 is configured to compare features of any inspected traffic to the legitimate traffic patterns (or their normal baselines).

Specifically, the inspected traffic features would allow for detecting attacks committed using, for example, the attack strategies mentioned above. The main objective would be to be able to handle HTTPS floods on the ingress side (client to server), the egress side (server to client), or both. That is, the rate-based features would allow for detecting abnormal (e.g., large) numbers of HTTPS requests and requests to URLs with large responses, or even with relatively small responses and many other attack approaches.

In other embodiments, the attacker can choose attack strategies that combine the alternatives mentioned above, or even randomly select an active approach as the attack is progressing over time. The attacker can start the attack with a large number of HTTPS requests to the victim server main HTML file, and then a large number of requests to WEB objects with large HTTPS responses, and then randomly select the URLs to request, and so on.

Further, the rate-invariant features may be utilized to reduce the number of false positive attacks detected in the case of a "flash crowd". For example, when a website initiates a sales campaign, the number of requests and responses loaded may be increased during the campaign due to legitimate users' activities. Thus, to offset such legitimate activities, rate-invariant features are also considered when determining if the inspected traffic demonstrates an HTTPS flood attack, or if the increase in traffic is due to legitimate increases in traffic and not due to attack tool activities.

The rate-invariant features examine the distribution of the size of the HTTPS requests and/or responses, the variability of the rate and volume of HTTPS requests and responses, correspondingly, the ratio between rate and volume of HTTPS requests and responses (both directions: for example, HTTPS requests per second divided by HTTPS response sizes per second and the opposite, HTTPS response sizes per second divided by the HTTPS requests per second), the ratio between HTTPS request volume and HTTPS request rate, and so on. Typically, HTTPS traffic, as generated by the attack tool 125, has different appearances "on the wire" as would be observed for legitimate client 120 traffic, generated by WEB browsers or other legitimate user-agents.

Typically, the attack tool 125 does not craft HTTPS requests as legitimate browsers do. That is, attack tools do not add well-crafted HTTP headers, WEB cookies, or TLS/SSL headers, or designate URLs typically requested by legitimate users to any, or most, requests or responses. In addition, attackers, when activating the attack tool 125 to issue HTTPS floods attack, cannot follow same URL request patterns as legitimate users do. An overall consequence of all these facts, the average size of HTTPS responses and requests generated by attack tools typically is different (shorter or larger) than the size of HTTPS requests and responses of legitimate client devices. The tools executing HTTPS flood attacks affect the distribution of the generated HTTPS' requests and responses. As a result, the legitimate client's behavior is noisy, while the attack tools issue a relatively constant and stable traffic pattern.

According to the disclosed embodiments, the defense system 110 is configured to determine, or to otherwise compute, normal baselines for each traffic feature. The baselines are continuously determined at peace-time and during predefined learning periods (e.g., a week, an hour, etc. that is used for learning the normal baseline). Once baselines are determined, the defense system 110 is configured to inspect all traffic directed to the victim server 130, compute the relevant traffic features, and determine any deviation of each, or combination of traffic features, from their respective baselines. The baselines, computed according to the disclosed embodiments, include a short baseline and a long baseline. The threshold may be determined based on a Maximum Deviation (MaxDev) technique computed based on the short or long baseline. Alternatively, the threshold may be determined based on a Standard Deviation (StdDev) technique computed based on the short or long baseline.

It should be noted that the traffic inspection by the defense system 110 is performed without decrypting the traffic, but rather by gathering traffic telemetric. Therefore, the defense system 110 does not need to maintain the encryption TLS/SSL, or other, decryption keys utilized by the client device 120 and the victim server 130. The method for detecting HTTPS flood attacks are discussed in detail below.

According to some embodiments, upon detection of an HTTPS flood attack, one or more mitigation actions may be performed. As noted above, the mitigation action may be executed by the mitigation resource 112 in the defense system 110. The mitigation action may be, for example, blocking, or rate-limiting, traffic from the client 120 to the server, challenging the client causing any traffic anomaly (e.g., CAPTCHA), redirecting the traffic to a scrubbing center for cleaning malicious traffic, and so on. In an embodiment, a mitigation action can start by challenging each entity (client device and/or attack tool) in the suspect list and end with a rate limit applied on these clients, or a blocking of these source IPs.

In the example deployment, the defense system 110 is connected in-line with the traffic between the client device 120 and the attack tool 125 toward the victim server 130. In this deployment, the defense system 110 is configured to process ingress traffic from the client device 120 and the attack tool 125 and egress traffic from the server 130. In yet another embodiment, when deployed in-line, the defense system 110 processes only ingress traffic from the client device 120 and the attack tool 125. The processed traffic is then transparently transferred to its destination (e.g., either the client device 120 and the attack tool 125 or the victim server 130).

It should be noted that although one client device 120, one attack tool 125, and one victim server 130 are depicted in FIG. 1 merely for the sake of simplicity, the embodiments disclosed herein can be applied to a plurality of clients and servers. The clients may be located in different geographical locations. The servers may be part of one or more datacenters, server frames, private clouds, public clouds, hybrid clouds, or combinations thereof.

It should be further noted that, in an embodiment, the defense system 110 is configured to receive, and, thus, process, only ingress (and not egress) traffic. Therefore, the defense system 110 needs to support these asymmetric network conditions when handling HTTPS flood attacks.

In some configurations, the victim server 130 may be deployed in a datacenter or a cloud computing platform, or on the premises of organization, and the like. The cloud computing platform may be a private cloud, a public cloud, a hybrid cloud, or any combination thereof. In addition, the deployment shown in FIG. 1 may include a content delivery network (CDN) connected between the client 120 and the server 130.

In another configuration, the defense system 110 operates as an always-on deployment, where the defense system 110 is part of a cloud protection platform. The cloud protection platform can be deployed as SaaS by third party cloud vendors.

In yet another configuration, a hybrid deployment of the defense system 100 and the cloud defense platform is provided. In such a deployment, a defense system is collocated with the victim server to process in-line traffic. When the defense system cannot efficiently mitigate a detected attack, e.g., due to the volume of the attack, the traffic is directed to the cloud defense platform. Typically, the cloud defense platform includes high-capacity mitigation resources.

Figure 2:
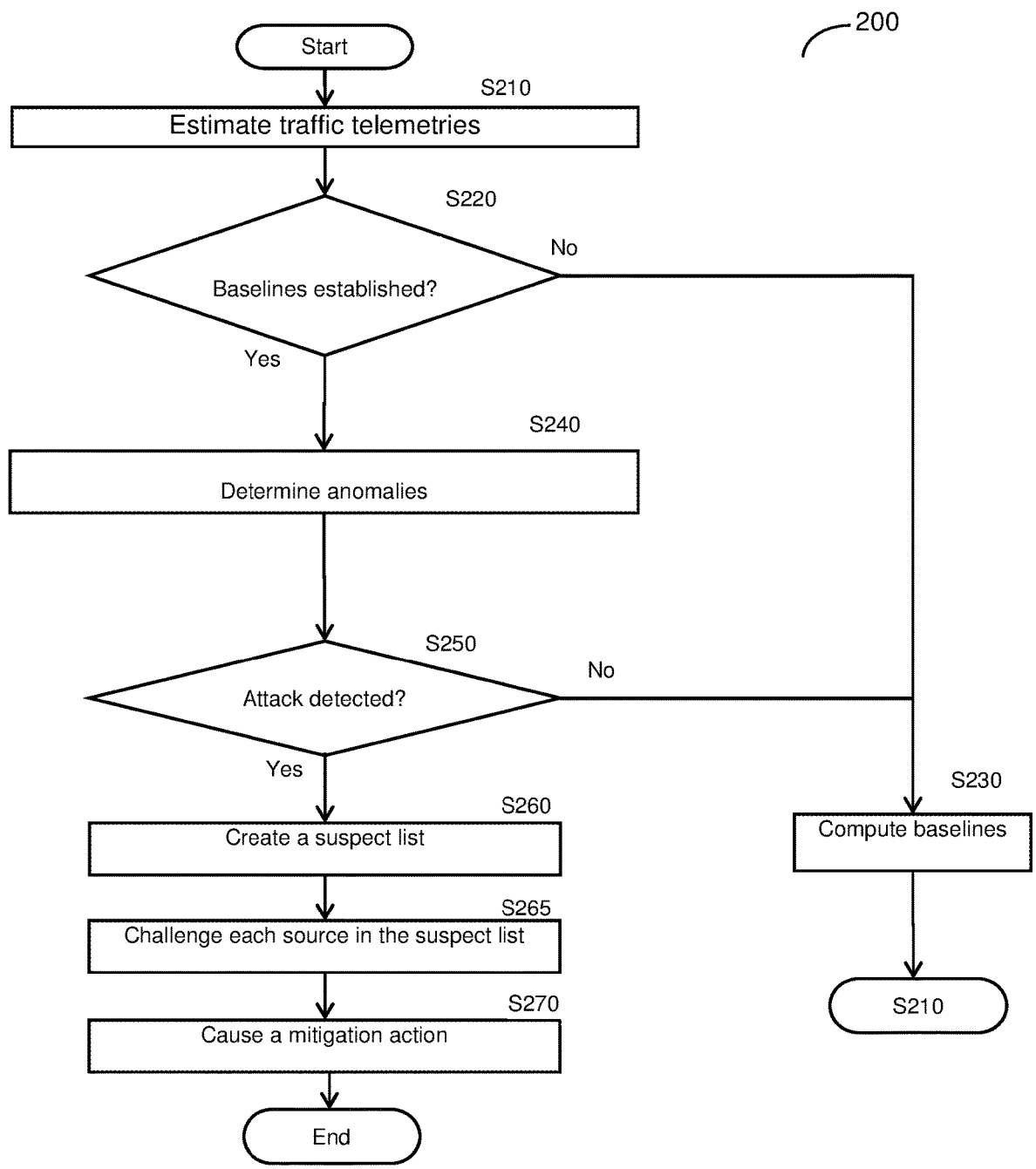
FIG. 2 is a flowchart describing a method for detecting and mitigating HTTPS flood attacks, according to some embodiments.

FIG. 2 shows an example flowchart 200 illustrating the detection of HTTPS flood attacks, according to an embodiment.

At S210, traffic telemetries are estimated. In an embodiment, S210 includes measuring (or sampling) of ingress (from the client to server) traffic and/or egress traffic (from the server to the client) at predefined time intervals (e.g., 1 second). Then, for each sample, traffic features are estimated. This includes estimating, for example, the total number of HTTPS requests, total volume (bytes) of HTTPS requests, total volume (bytes) of HTTPS responses, lists of all requests and their sizes and the source IP generating each request, and lists of all responses and their sizes and the source IP target of each response.

As noted above, the detection is performed without decrypting the traffic. Thus, there is no way to determine exactly the number of HTTP requests, their sizes, and the volume of HTTP responses, by merely parsing and examining HTTPS responses as plain text. As a result, according to the disclosed embodiments, the estimation is based on the synchronous property as dictated by the HTTP version 1.x. When communicating using the HTTP requests, the client sends a single HTTP request and, only then, the server answers with a response. HTTP communicates over Transmission Control Protocol (TCP). The information carried in a header of a TCP packet can be utilized to estimate the existence of HTTP requests and responses, and the size of the responses and requests. Specifically, the TCP SEQ number and the TCP ACK number designated in the TCP header can be utilized to estimate the size of the request and response, respectively.

To estimate the required telemetries, for each individual TCP connection, TCP packets including "application data" SSL records header (content_type=23) are identified. These packets are used to carry TLS application traffic, i.e. the actual HTTPS applicative payloads. Such packets are utilized to estimate telemetry related to the requests. The application data may be composed of a number of IP packets.

To estimate the request size, the progress of a TCP SEQ number is monitored. In an embodiment, the TCP SEQ number designated in the first packet in an HTTP request is subtracted from the TCP SEQ number designated in the last packet of a previous request to estimate the size of a current sampled request. To estimate the response size, the TCP ACK number of the current request is subtracted from the most recent TCP ACK number from previous request. It should be noted that TCP ACK reflects the number of bytes received by the client device from server, and, thus, can reflect the overall bytes HTTPS responses are composed from.

At S220, it is checked if the learning period has elapsed. If so, execution continues with S240; otherwise, at S230, at least one feature baseline is computed for each traffic feature. Then, execution returns to S210 to compute the baselines during the learning period. The learning period may be set to a predefined time window or until enough data is gathered and collected. A baseline is established during peace-time or data is gathered at peace-time, i.e., when no attack traffic is detected.

According to the disclosed embodiments, at least one baseline is continuously computed based on samples of the traffic features to determine normal activity of rate-based and rate-invariant features of the inspected traffic. In one embodiment, two types of baselines are computed for each traffic feature, a short-term and long-term baseline.

The traffic features are utilized to determine the baseline and then determine abnormal activity, respectively. The traffic features are rate-based and rate invariant. The rate-based traffic features include a number of HTTPS requests per second (RPS), an HTTPS response size or volume measured in bytes per second, and a volume of HTTPS requests measured in bytes per second. The rate-invariant features include a distribution of HTTPS request sizes, a distribution of HTTPS response sizes, an ingress/egress ratio measured as the ratio between an ingress number of HTTPS requests per second and an egress HTTPS response volume measured in bytes per second, and an egress/ingress ratio measured as the ratio between an egress HTTPS response volume in bytes per second and an ingress number of requests per second.

The rate-invariant features may also include a relative variance. The relative variance may be determined for the ingress requests per second, the relative variance for an ingress bytes per second, and relative variance for the egress bytes per second. A traffic feature may be a combination of all the above-noted features.

The short-term baseline is computed for short-term changes, i.e., changes that are roughly short in their longevity. The short-term period may be, for example, an hour. The short-term baseline is utilized to follow hourly changes in HTTPS traffic, and, therefore, detect anomalies caused due to relatively rapid changes in the HTTPS traffic's behavior, as can be observed during attack time. It is valuable to follow hourly changes in traffic in order to eliminate high attack thresholds during high and low time periods, and also follow changes in legitimate traffic during busy periods or similar.

The long-term baseline is computed for long-term changes, i.e., computer changes that reflect long-term period trends in traffic. The long-term period may be, for example, a week. The long-term baseline is utilized to detect anomalies caused due to slow changes in the traffic's behavior. The long-term baseline compliments the short-term baseline because it can eliminate cases when attackers "slowly" change the attack load that can be computed as legitimate baselines.

In an embodiment, the long-term baseline can be computed using an IIR LP filter configured with low-frequency defined pass- and stopbands (e.g., order of magnitude 1/week), while the short-term baseline can be computed using IIR LP filters with a higher pass-filter and stopband filter (e.g., an order of magnitude 1/hour and 1/minute, respectively). The two baselines computed for each traffic feature are kept. It should be noted that each baseline is continuously updated.

In an embodiment, the following baseline activities are taken in order to learn the normal behavior of various traffic features. For the rate-based traffic features, a number of HTTPS requests per second (RPS), HTTPS response sizes or volume, and a volume of HTTPS requests for both short-term and long-term baselines is continuously calculated. For the rate-invariant features, the distribution of HTTPS request size histograms, and the distribution of HTTPS response sizes long-term is continuously calculated. For the rate-invariant features ingress/egress ratio and egress/ingress ratio, the short term-baseline is calculated. For relative variance baseline, for its various traffic features, a mid-term to long-term baseline is computed.

At S240, after baselining of the various rate-based and rate-invariant traffic features, various deviations from these baselines are to be detected as traffic anomalies. In an embodiment, the anomaly detection is performed by dynamic learning, during-peace time, of the typical maximal deviation of traffic from its momentary-computed baseline. States where real time samples of each traffic feature exceed the threshold in amount equal or greater to/from the maximal deviation continuously for some time are considered anomalous.

In an embodiment, a threshold may be determined as follows:

$$U(t)=Y(t)+\mathrm{maxDev}(t)$$

where $U(t)$ is an anomaly threshold, $Y(t)$ is the baseline, and maxDev(t) is the maximal deviation of an observed traffic feature during peace-time corresponding to the required value of the false positive detection rate of the observed traffic feature. For the given false probability rate, the maxDev(t) is considered as the maximal "legitimate" deviation from the momentary baselines; it is also updated with each new sample.

The maxDev is continuously computed during the learning period and during peace time, as a measurement for the actual legitimate deviation from the momentary baseline of the various traffic features. The maxDev allows for anomaly detection, as it compares the legitimate deviation in traffic (due to legitimate traffic statistics behavior), to deviations caused by malicious activities. The maxDev is separately computed against the short-term and long-term baselines.

In an embodiment, the maxDev is computed using the measured standard deviation $\sigma$ multiplied by a constant multiplier $\rho$. That is:

$$\mathrm{maxDev}=\rho\sigma$$

The standard deviation is measured against the various relevant traffic features and others.

The standard deviation is computed during peace time over each of the above-mentioned traffic features for their corresponding baselines. The value of the multiplier $\rho$ may be related to the desired false positive detection rate of the observed features. In an embodiment, the multiplier $\rho$ is a preconfigured parameter defining the sensitivity.

At S250, once the various traffic features' baselines are computed, the estimated traffic telemetries, or the momentary real time traffic feature values, are compared to the baselines to determine whether an anomaly exists. Each traffic telemetry is established for its respective baselines (both short and long, or short or long separately). An anomaly is detected as a deviation from one of the short-term or long-term baselines. When using the maxDev as a baseline threshold, each sample is compared with baseline threshold $U(t)$. An alert is generated, when samples exceed the threshold several times in a row, triggering an alarm.

Following one exemplary embodiment for detecting anomalies, the traffic features are rate-based and rate-invariant features. In an embodiment, a rate-based anomaly is detected based on a total number of HTTPS requests and a total volume (bytes) of HTTPS requests and responses. Any variance from the respective baselines that exceeds the momentary threshold is determined to be an anomaly. Some example embodiments for detecting anomalies are discussed in detail below.

An anomaly alert is triggered only after configurable consecutive detections of such anomalies satisfying the above equation. In an embodiment, a predefined number (e.g., 5 or 10) of consecutive detections can be considered as an alarm.

In an embodiment, a rate-invariant anomaly is detected based on an abnormal distribution of the size of HTTPS requests and responses. In an embodiment, an abnormal distribution is determined based on the probability that a request's size would fit a specific bin. A bin is defined as a single "bucket" in the distribution. Each bin may be configured using two parameters: "BINWidth" which is a system wide static attribute for size of all BINs in distribution, e.g. 128 bytes; and NumOfBINs, which is a system-wide static attribute for size of all BINs in distribution, e.g. 1024 BINs. The distributions are computed from a pre-defined static number of BINs (NumOfBINs), where each BIN has a pre-defined static Width (BINWidth).

The distribution of each BIN is computed for every sample as the total number of requests in a BIN, divided by the total number of requests in the sample. The distribution of each bin reflects the overall probability of an individual HTTPS request, or response, accordingly, to appear in a specific bin.

During peace-time, a baseline is continuously computed over each bin probability in order to build the baseline distribution. The baseline is computed as a long-term baseline.

In an example embodiment, an anomaly is detected when a BIN value computed for current traffic ("real-time distribution") is different (larger or smaller) than the value of the same BIN as computed during a learning period ("baseline distribution"). Alternatively, an anomaly is detected when the number of active BINs in the real-time distribution is higher than the average number of BINs in the baseline distribution.

In yet another example embodiment, another rate-invariant feature, computed as a ratio between ingress HTTPS requests per second to egress response volumes in bytes per second, is maintained. For this feature, a short-term baseline and appropriate MaxDev are computed to determine a normal peace time deviation and cases of anomalies, in a similar means as for other traffic features. This attribute is assumed to be relatively large under attacks, reflecting unproportionally, compared to peace time, with small responses and remaining almost unchanged in flash crowd.

In yet another example embodiment, another rate-invariant feature, computed as the ratio between egress HTTPS response volume in bytes per second to ingress HTTPS request per second, is maintained. A short-term baseline and appropriate MaxDev threshold are computed to determine a normal peace-time deviation and cases of anomalies, in a similar means as for other traffic features. This attribute is assumed to be relatively large for attacks reflecting unproportionally, compared to peace time, with small responses and remaining almost unchanged in flash crowd.

In yet another example embodiment, another rate invariant feature is computed as the relative variance for an ingress number of HTTPS requests per second. The baseline is computed as a short-term baseline over this feature. The real-time value of relative variance is computed persistently, including during attacks, and is compared to the short-term baseline of the relative variance feature. In an example, if this value is at least 50% less than corresponding baseline value, then an anomaly is detected.

In yet another example embodiment, another rate invariant feature is computed as the relative variance for an ingress volume of HTTPS requests per second. The baseline is computed as a short-term baseline over this feature. The real-time value of relative variance is computed persistently, including during attacks, and is compared to the short-term baseline of the relative variance. In an example, if this value is at least 50% less than corresponding baseline value, then an anomaly is detected.

In yet another example embodiment, another rate invariant feature is computed as the relative variance for an egress volume of HTTPS responses per second. The baseline is computed as a short-term baseline over this feature. The real-time feature of relative variance is computed persistently, including during attacks, and is compared to the short-term baseline of the relative variance. In an example, if this value is at least 50% less than corresponding baseline value, then an anomaly is detected.

At S250, based on the anomaly indications (detected anomalies) it is determined if an HTTPS flood attack is currently on-going. If so, execution continues with S260; otherwise, execution returns to S210. An attack is detected when an anomaly is measured on both at least one rate based traffic feature and the at least one rate-invariant traffic features. In an embodiment, an HTTPS flood DDoS attack is detected when an anomaly is detected in ingress HTTPS requests per second or ingress HTTPS request volume or egress HTTPS response volume, and an anomaly is detected in a ratio between ingress HTTPS requests rate and egress HTTPS response volume or in a ratio between egress HTTPS response volume to ingress HTTPS requests rate or relative variance in ingress HTTPS requests rate or relative variance in ingress HTTPS requests volumes or relative variance in egress HTTPS volume or in HTTPS request size distribution or in HTTPS response size distribution.

At S260, upon detection of an attack, a "suspect list," which may include a list of source IPs of client devices that trigged detection of anomalies, is created. At S265, each client in the suspect list is challenged to determine if the client device is a bot or operated by a real user.

At S270 at least one mitigation action is executed on each client device determined to be an attack tool. The mitigation action may include generating alerts, causing the client to perform a challenge, redirecting traffic from the client to a scrubbing center, blocking client traffic, and so on, or a combination thereof.

As noted above, an HTTPS flood DDoS attack is detected responsive to a short-term baseline, a long-term baseline, or both. A long-term baseline is a time series of the rate-based feature estimates that averages the traffic rate on a long-term basis. Thus, such a baseline is not sensitive to daily changes. The long-term baseline is a good reference point for detection of slow-developing attacks. In an embodiment, a long-term baseline is computed using an Infinite impulse Response (IIR) low-pass filter (LPF). In an embodiment, the IIR LPF is configured differently to compute the long-term baseline for the traffic features, including the RPS and BPS.

The short-term baseline (SBL) is a time series of the rate-based estimates that smooths momentary random deviations of the rate samples, saving the principal changes with characteristic time much greater than in attacks. The short-term baseline is computed with an IIR LPF, tuned for a demanded passband and stopband. The short-term baseline is updated not with every sample, but every short, predefined time interval (e.g., 60 seconds). The samples are averaged for the time interval and only these average values feed the LPF. These are performed due to precision limitations when the passband and stopband are much greater than the sampling frequency.

In an embodiment, baselines are separately computed for the traffic features of RPS and BPS, for their direct and inverse ratios: BPS/RPS and RPS/BPS, and for their relative variances: RVrps and RVbps. Therefore, 6 short-term baselines are computed.

The IIR LPF is utilized for both the short-term and long-term baselines, but is configured differently for each baseline type. Typically, an IIR LPF in linear form:

$$aY+bX=0$$

is used to unbias estimates of a next rate sample value Y upon the previous sample values X and the previous estimates of Y, such that slow changes in the rate pass with minimal changes. The changes' characteristic time for the passband includes dozens of minutes for the short-term baseline, and weeks for the long-term baseline, while rapid changes are strongly attenuated. The IIR LPF is typically defined as follows:

$$Y_n = \Sigma_{i=0}^{Nb-1} b_i X_{n-i} - \Sigma_{i=1}^{Na-1} a_i Y_{n-i}$$

The sample values 'Y' and 'X' are maintained in separate buffers having a size of the LPF.

In an embodiment, each buffer is a dedicated cyclic FIFO buffer for keeping several last samples of input/output. Initially, the buffers are filled with a padding value, which is the average value of several previous samples or the first valid sample.

The coefficients 'a' and 'b' are determined based on the threshold type. Specifically, for a long-term baseline, the coefficients are set as follows:

$$a_1 = -(1-\alpha) \text{ and } b_0 = \alpha, \text{ where } \alpha = (1 \ldots 2) \times 10^{-6}.$$

For a short-term baseline, the coefficients are set using, for example, a Chebyshev II LPF with the passband $\frac{1}{3600}$ Hz, the stopband $\frac{1}{300}$ Hz at the sampling frequency $\frac{1}{100}$ Hz and the attenuation in the stopband −80 dB ($10^{-4}$). For example, the coefficients are set as follows:

| $b_{0\ldots4}$ | $a_{0\ldots4}$ |
|---|---|
| 0.00054235952050727743 | 1.00000000000000000000 |
| 0.00035782268895820829 | −3.36707903020318433107 |
| 0.00079540707406585006 | 4.29400777207437123195 |
| 0.00035782268895820829 | −2.45402676987025358812 |
| 0.00054235952050727743 | 0.52969379949206418789 |

Figure 3:
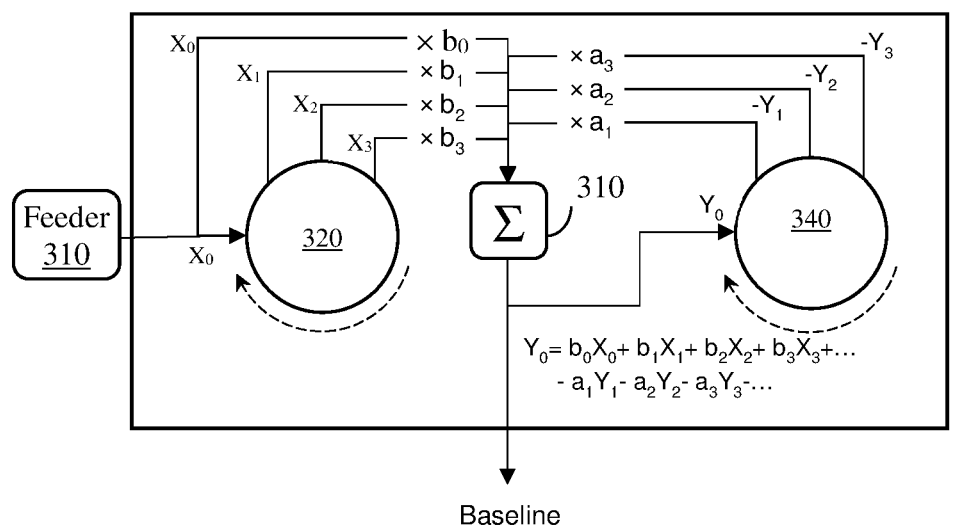
FIG. 3 is an example diagram for computing a short-term baseline using an IIR LPF.

FIG. 3 shows an example diagram of an IIR LFR 300 for computing a short-term baseline. During peacetime, a feeder 310 feeds all samples of the HTTPS request rate to a circular buffer 320 to feed an IIR LPF 330. The IIR LPF 330 continually produces the short-term baseline and the prediction of the next sample. The outputs of the IIR LPF 330 are fed to another circular buffer 340 to proceed with the IIR LPF recursive operation. The immediate output value is assigned to the short-term baseline Y(t). The short-term baseline is defined as follows:

$$Y(t) = LPF(X(t), Y(t))$$

To detect an anomaly, the predicted value, which is the last baseline value 'Y' is compared with the new sample 'X' and their difference, 'Δ' is analyzed.

The diagram illustrated in FIG. 3 can be utilized to compute the long-term baseline. However, the computation is performed by feeding HTTPS response rates and setting the LPF's 300 coefficients to different values.

Figure 4:
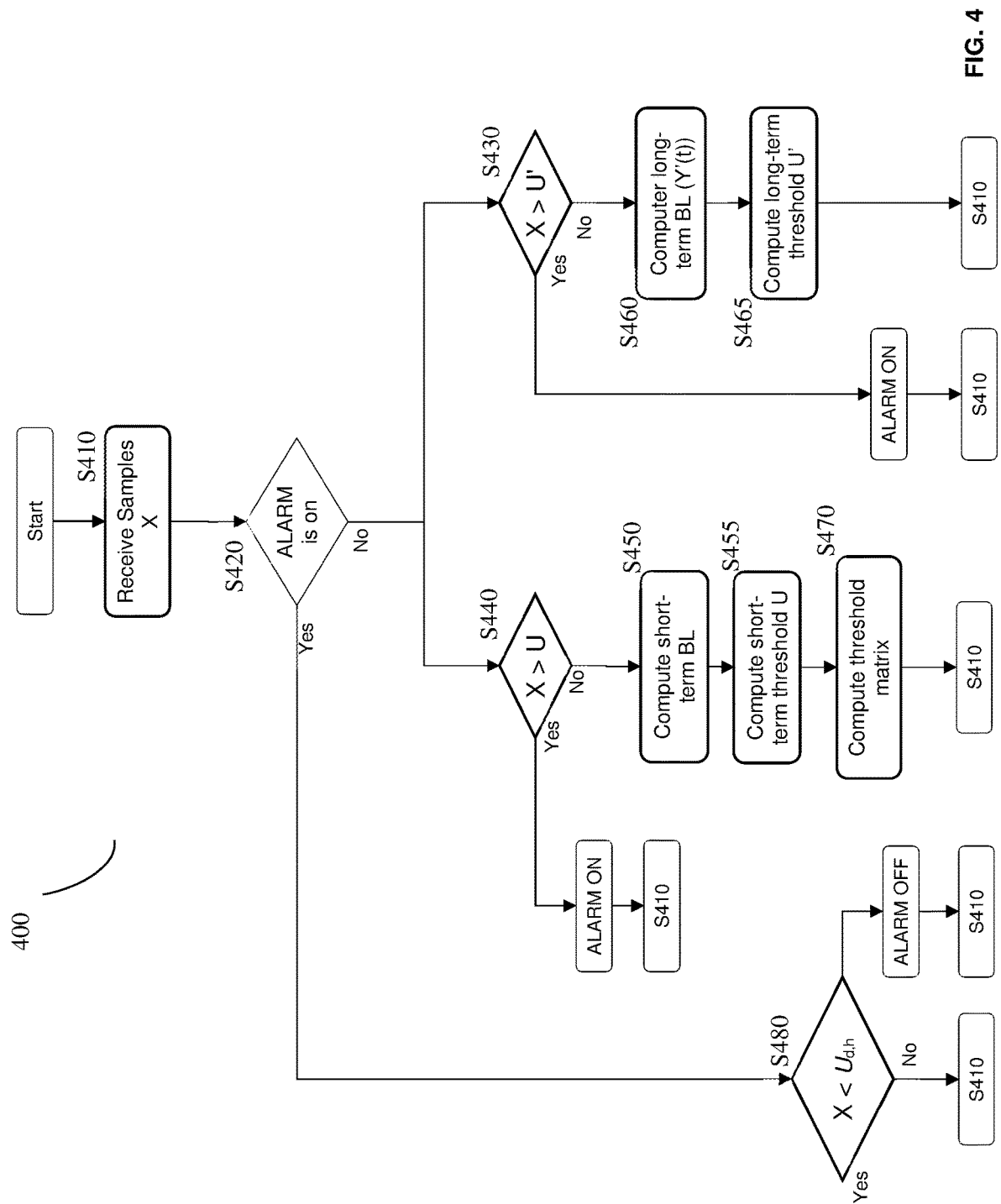
FIG. 4 is an example flowchart for detecting anomalies in HTTPS traffic based on short-term and long-term baselines, according to an embodiment.

FIG. 4 shows an example flowchart 400 for detecting anomalies in HTTPS traffic based on short-term and long-term baselines according to an embodiment.

At S410, samples of inspected HTTPS traffic are received. The samples of HTTPS traffic may include rate-based and rate-invariant features of HTTPS responses and requests.

At S420, it is checked if an attack alarm is on. That is, if there is an ongoing attack. If not, the short-term and long-term baselines are computed (or otherwise updated) during peacetime. If there is an on-going attack, execution continues with S480.

Prior to computing the baselines, it is checked if there is an on-going attack by comparing the current samples to previously computed transitory thresholds.

Specifically, at S430, during the operation phase, a current sample is compared with the long-term transitory threshold U'(t), and the event of exceeding the threshold several times in a row triggers the attack alarm. That is, the attack alarm is set to 'on' when abnormal behavior with respect to the long-term baseline is detected. Further, at S440, each sample is compared with the short-term transitory threshold U(t), and the event of exceeding the threshold several times in a row triggers the attack alarm. That is, the attack alarm is set to 'on' when abnormal behavior with respect to the short-term baseline is detected.

At S450, the short-term baseline Y(t) is computed using the IIR LPF. The embodiments for computing the short-term baseline are discussed above.

At S455, a short-term transitory threshold 'U(t)' is computed based on the short-term threshold Y(t). In an embodiment, the transitory threshold 'U(t)' is computed as follows:

$$U(t) = Y(t) + \text{maxDev}$$

Then, execution returns at S410. The maxDev value is maximal allowable deviation of the difference 'Δ' of the current sample from the baseline, corresponding to the required value of the false positive detection rate. There are a number of methods to compute the maxDev value. In a first method, this value is computed based on the estimation of the standard deviation 'σ' of the difference 'Δ' multiplied by a constant multiplier ρ.

$$\text{maxDev} = \rho\sigma;$$

The multiplier 'ρ' defines the sensitivity, i.e., a rate of false positive alerts. In an example embodiment, the multiplier 'ρ' is set between 4 and 6. The standard deviation may be estimated using the following recurrence equation:

$$\sigma \leftarrow (1-\beta)\sigma + \beta(\Delta^2)/\sigma$$

where $0 < \beta \ll 1$ is a fading coefficient. For a sampling frequency of 1 Hz, β may be set to a value of ≈1.5×10-6.

In yet another example embodiment, the maxDev is computed based on a value of difference 'Δ' between the current sample and the computed short-term baseline and an index clipping the last highest FP×N samples from the virtual set of the last N samples, where FP is the permitted false positive rate. That is, the maxDev value may be computed as follows:

$$\text{maxDev} = (\Delta_n : n = \lceil(1-FP)N\rceil)$$

The samples in '$\Delta_n$' are sorted in descending order, where the entire virtual set is continuously updated.

To define the momentary value of maxDev, a Threshold Set (TS) of the 2×FP×N highest values of the deviations from the baseline, $\Delta_n$ (n=1, 2, ..., 2×FP×N), of the last N samples is kept and sorted in descending order, where N>>1/FP. Then, the median value ($\Delta_n : n = \text{ceil}((1-FP)N)$) is defined as the maximal allowable deviation, maxDev. As noted above, during the operation phase, each sample is compared with the short-term transitory threshold U(t).

At S460, the long-term baseline Y'(t) is computed using the IIR LPF. The embodiments for computing the long-term baseline are discussed above.

At S465, a transitory threshold 'U'(t)' is computed based on the long-term threshold Y(t). That is, the transitory threshold 'U'(t)' is computed as follows:

$$U'(t) = Y'(t) + \text{maxDev}(t)$$

As noted above, during the operation phase, each sample is compared with the long-term transitory threshold U'(t). It should be noted that attacks may be detected not only based on the short and long baselines, but also based on the size distribution of HTTPS requests and/or responses. Such distributions are not detected using the short-term and long-term baselines.

In an embodiment, to determine if an on-going attack has been terminated, at S470, a threshold matrix '$U_{h,d}$' is computed. Then, execution returns at S410.

In an embodiment, the threshold matrix '$U_{h,d}$' is computed for each hour in a week. That is, each element in the threshold matrix is an estimate of the average transitory threshold U(t) at a certain hour and day of the week. For example, the threshold matrix may be computed as follows:

$$U_{h,d}^{(24 \times 7)} \leftarrow (1-\gamma)U_{h,d}^{(24 \times 7)} + \gamma U(t | d = \lfloor t \rfloor \bmod 7, h = \lfloor 24t \rfloor \bmod 24)$$

where t is current time in days, $U_{h,d}^{(24 \times 7)}$ is an element in the row h and the column d, $0 \le h \le 23$, $0 \le d \le 6$, $0 < \gamma \ll 1$ is a fading coefficient. Since these values are used only to detect an attack's end, the appropriate value of γ may of order of magnitude of reciprocal hour if the sampling frequency is 1 Hz, then $\gamma \approx 2 \times 10^{-4}$. Note that this factually means that several last corresponding time slots are effectively taken into account.

At S480, a check is made if the current sample 'X' is lower than the threshold matrix computed at S470. If so, the attack alarm is set to go off. That is, the attack has terminated. In an embodiment, if the sample is lower than the corresponding element in the threshold matrix '$U_{h,d}$', then the alarm is set to go off. In another embodiment, if a number of constitutive samples are lower than the corresponding element in the threshold matrix '$U_{h,d}$', then the alarm is set to go off.

In another embodiment, to determine if an attack is ended, the current traffic rate is compared to an end-of-attack threshold, and, when the current rate is lower than such threshold, the attack has terminated. The end-of-attack threshold is a weighted average between the last baseline value right before attack and the average rate during attack.

It should be noted that step S480 is performed when the attack alarm is 'on', while step S470 is performed in peacetime.

It should be noted that the state ALARM ON is defined on the rate features, such as packets per second, bytes per second, new connections per second, etc., and it indicates on the ATTACK state only in combination with detection at the same time of abnormality upon at least one of above-mentioned rate-invariant features: relative variances, ratios of ingress or/and egress rates, distributions of sizes of individual packets, or requests, or responses. Such combination allows to distinguish between an attack and flash crowd.

Figure 5:
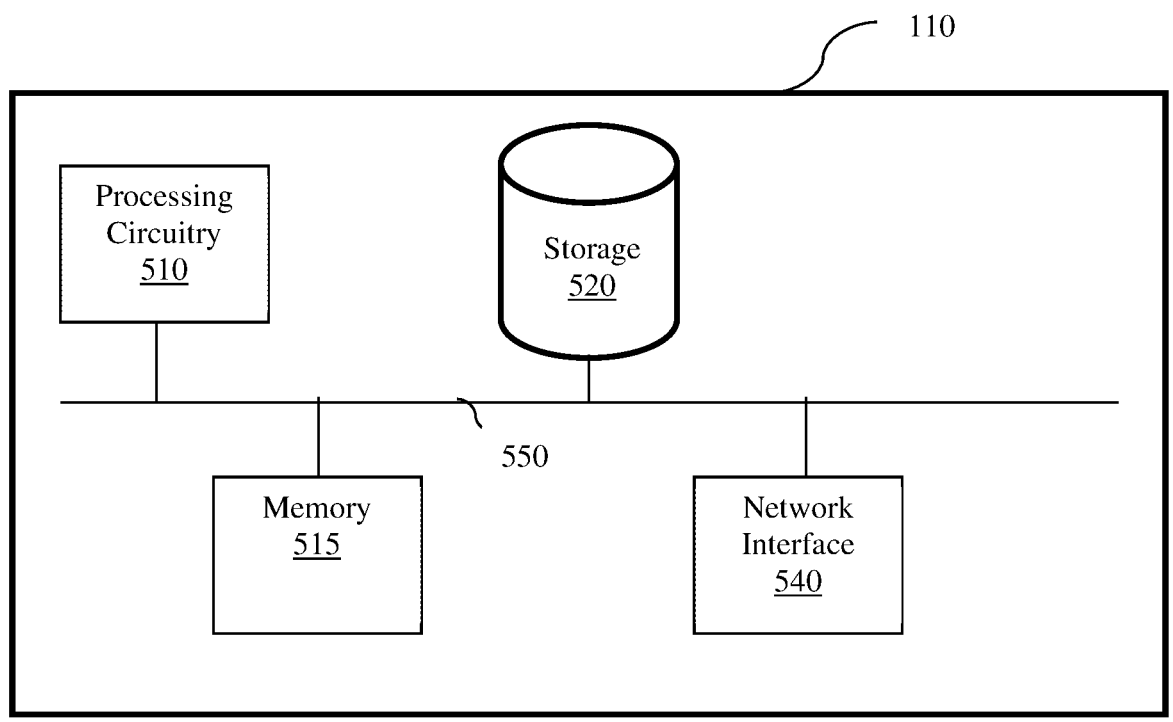
FIG. 5 is a block diagram of the defense system for detecting and mitigating encrypted attacks according to one embodiment.

FIG. 5 is an example block diagram of the defense system 110 implemented according to an embodiment. The defense system 110 includes a processing circuitry 510 coupled to a memory 515, a storage 520, and a network interface 540. In another embodiment, the components of the defense system 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 510 to perform the embodiments described herein.

The storage 520 may be magnetic storage, optical storage, and the like, and may be realized, for example, as flash memory or other memory technology, CD-ROM, Digital Versatile Disks (DVDs), or any other medium which can be used to store the desired information. The storage 520 may include workflow schemes as described herein.

The processing circuitry 510 is configured to detect and cause mitigation of HTTPS flood attacks, and any encrypted DDoS attacks, as described herein.

The network interface 540 allows the defense system 110 to communicate at least with the servers and clients. It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for detecting anomalous hypertext transfer protocol secure (HTTPS) traffic, comprising:
receiving samples of at least rate-based features, wherein the rate-based features demonstrate a normal behavior of at least HTTPS traffic directed to a protected entity;
setting a first Infinite impulse response (IIR) low pass filter (LPF) to compute the short-term baseline;
setting a second IIR LPF to compute the long-term baseline;
computing the short-term baseline and the long-term baseline based on the received samples, wherein the short-term baseline is adapted to relatively rapid changes in the HTTPS traffic and the long-term baseline is adapted to relatively slow changes in the HTTPS traffic;
computing at least one short-term threshold based on the short-term baseline and at least one long-term threshold based on the long-term baseline;
evaluating each of the at least one threshold against real-time samples of HTTPS traffic to determine whether behavior of the HTTPS traffic is anomalous; and
generating an alarm when anomaly is detected.

2. The method of claim 1, wherein anomalous behavior is determined when a real-time sample exceeds any one of: the short-term threshold and the long-term threshold.

3. The method of claim 1, wherein each of the first IIR LPF and the second IIR LPF includes:
an input circular buffer to buffer the received samples; and
an output circular buffer to buffer outputs of the IIR LPF.

4. The method of claim 1, wherein each of the first and second IIR LPF filter is set as follows:

$$Y_n = \sum_{i=0}^{N_b-1} b_i X_{n-i} - \sum_{i=1}^{N_a-1} a_i Y_{n-i}$$

where $b_i$ and $a_i$ are the coefficients.

5. The method of claim 4, wherein the coefficients of the first IIR LPF and the second IIR LPF are different.

6. The method of claim 5, wherein each of the short-term threshold and long-term threshold are computed as a sum of the respective baseline and a momentary maximum deviation (maxDev) value.

7. The method of claim 6, wherein the maxDev value is a maximal difference '$\Delta$' between a current sample and the respective computed baseline, wherein the value of the maximal difference '$\Delta$' is defined based on a pre-configured permitted false positive rate.

8. The method of claim 7, wherein the maxDev value is computed as follows:
maxDev=$\rho\sigma$, wherein '$\sigma$' is an estimation of a standard deviation of a difference '$\Delta$' and '$\rho$' is a constant number predetermined based on a required sensitivity.

9. The method of claim 7, wherein the maxDev value is computed as follows:
maxDev=($\Delta_n$; n=$\lceil(1-FP)N\rceil$), where FP is a parameter defining a required sensitivity, wherein samples in a dataset of '$\Delta_n$' are sorted in descending order the highest absolute values of deviations from the respective computed baseline, among the last N samples.

10. The method of claim 1, further comprising:
determining whether the HTTPS traffic returned to demonstrated normal behavior comparing end-of attack threshold to a current sample.

11. The method of claim 10, further comprising:
computing an end-of attack threshold matrix, wherein each element in the threshold matrix is an estimate of an expected short-term threshold at a certain hour and day of a week;
comparing the threshold matrix to a current sample; and
determining a normal behavior when a current sample is lower than the corresponding element in the threshold matrix.

12. The method of claim 10, further comprising:
computing an end-of attack threshold as a weighted average between a last baseline value before detecting abnormal behavior attack and an average rate during period of time when abnormal behavior was detected.

13. The method of claim 1, wherein a rate-based feature includes any one of: a number of HTTPS requests per second (RPS), a volume of HTTPS responses measured in number of bytes per second, and a volume of HTTPS requests measured in bytes per second.

14. The method of claim 1, wherein the anomalous behavior of the at least HTTPS traffic indicates a potential HTTPS flood DDoS attack.

15. The method of claim 14, wherein the method is performed by a defense system including at least a detector for detecting anomalous behavior and a mitigation resource for performing a mitigating action when anomalous behavior is detected.

16. The method of claim 15, wherein the defense system is deployed in-line with traffic between client devices accessing the protected entity, wherein the protected entity is deployed in any one of: a cloud computing platform and an on-premises datacenter.

17. The method of claim 15, wherein the defense system is installed in a cloud defense platform as an always-on deployment, wherein the cloud defense platform is deployed between client devices and the protected entity.

18. A non-transitory computer readable medium having stored thereon instructions for causing a processing circuitry to execute a process for detecting anomalous hypertext transfer protocol secure (HTTPS) traffic, the process comprising:
receiving samples of at least rate-based features, wherein the rate-based features demonstrate a normal behavior of at least HTTPS traffic directed to a protected entity;
setting a first Infinite impulse response (IIR) low pass filter (LPF) to compute the short-term baseline;
setting a second IIR LPF to compute the long-term baseline;
computing the short-term baseline and the long-term baseline based on the received samples, wherein the short-term baseline is adapted to relatively rapid changes in the HTTPS traffic and the long-term short-term baseline is adapted to relatively slow changes in the HTTPS traffic;
computing at least one short-term threshold based on the short-term baseline and at least one long-term threshold based on the long-term baseline;
evaluating each of the at least one threshold against real-time samples of HTTPS traffic to determine whether the behavior of the HTTPS traffic is anomalous; and
generating an alarm when anomaly is detected.

19. A system for detecting anomalous hypertext transfer protocol secure (HTTPS) traffic comprising:
a processing circuitry; and
a memory, the memory containing instructions that, when executed by the processing circuitry, configure the system to:
receive samples of at least rate-based features, wherein the rate-based features demonstrate a normal behavior of at least HTTPS traffic directed to a protected entity;
set a first Infinite impulse response (IIR) low pass filter (LPF) to compute the short-term baseline;
set a second IIR LPF to compute the long-term baseline;
compute the short-term baseline and the long-term baseline based on the received samples, wherein the short-term baseline is adapted to relatively rapid changes in the HTTPS traffic and the long-term short-term baseline is adapted to relatively slow changes in the HTTPS traffic;
compute at least one short-term threshold based on the short-term baseline and at least one long-term threshold based on the long-term baseline;
evaluate each of the at least one threshold against real-time samples of HTTPS traffic to determine whether the behavior of the HTTPS traffic is anomalous; and
generate an alarm when anomaly is detected.

* * * * *